United States Patent [19] [11] 3,970,278
Studer [45] July 20, 1976

[54] JACK STAND

[76] Inventor: Altee C. Studer, 9818 Hawley Road, El Cajon, Calif. 92021

[22] Filed: Dec. 3, 1975

[21] Appl. No.: 637,132

Related U.S. Application Data

[63] Continuation-in-part of Ser. No. 477,697, June 10, 1974, abandoned.

[52] U.S. Cl. .................................. 248/352; 248/165
[51] Int. Cl.[2] .............................................. B60S 9/02
[58] Field of Search ........... 248/352, 346, 351, 163, 248/165, 44, 48, 188

[56] References Cited

UNITED STATES PATENTS

| | | | |
|---|---|---|---|
| 1,729,958 | 10/1929 | Morris | 248/165 X |
| 2,274,794 | 3/1942 | Kitchen | 248/351 X |
| 2,330,105 | 9/1943 | Barrows | 248/351 |
| 2,356,941 | 8/1944 | Meyer | 248/352 |
| 2,561,693 | 7/1951 | Frye | 248/44 |
| 3,599,923 | 8/1971 | Hunnicutt et al. | 248/352 |
| 3,779,497 | 12/1973 | Webber | 248/165 |
| 3,875,873 | 4/1975 | Howitt | 248/188 X |

*Primary Examiner*—Roy D. Frazier
*Assistant Examiner*—Robert W. Gibson, Jr.

[57] ABSTRACT

A stationary jack stand for supporting such things as the draw bar end of a trailer has a base, four struts and a cap, capable of ready assembly and disassembly. On the base are four recesses into which are inserted the lower ends of the respective struts. The cap has four pockets much closer together than those of the base into which upper ends of the respective struts are slid. When a weight is applied to the top of the cap all parts remain interlocked together. To disassemble, the top is lifted free from the struts and they in turn can be lifted free of the recesses in the base.

6 Claims, 8 Drawing Figures

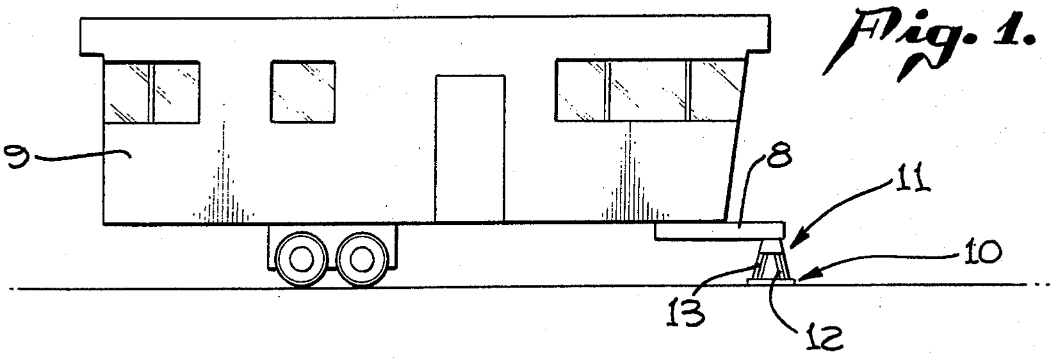
Fig. 1.
Fig. 3.
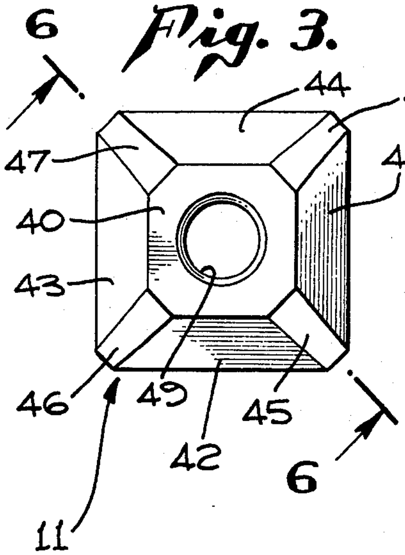
Fig. 4.
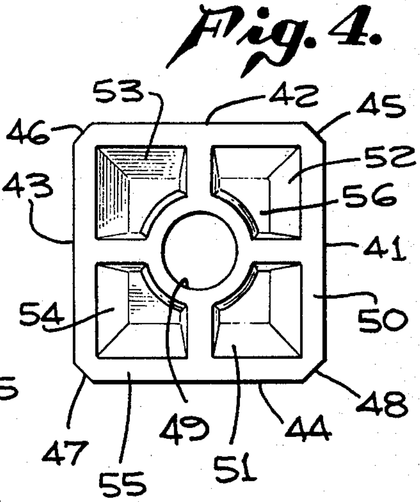
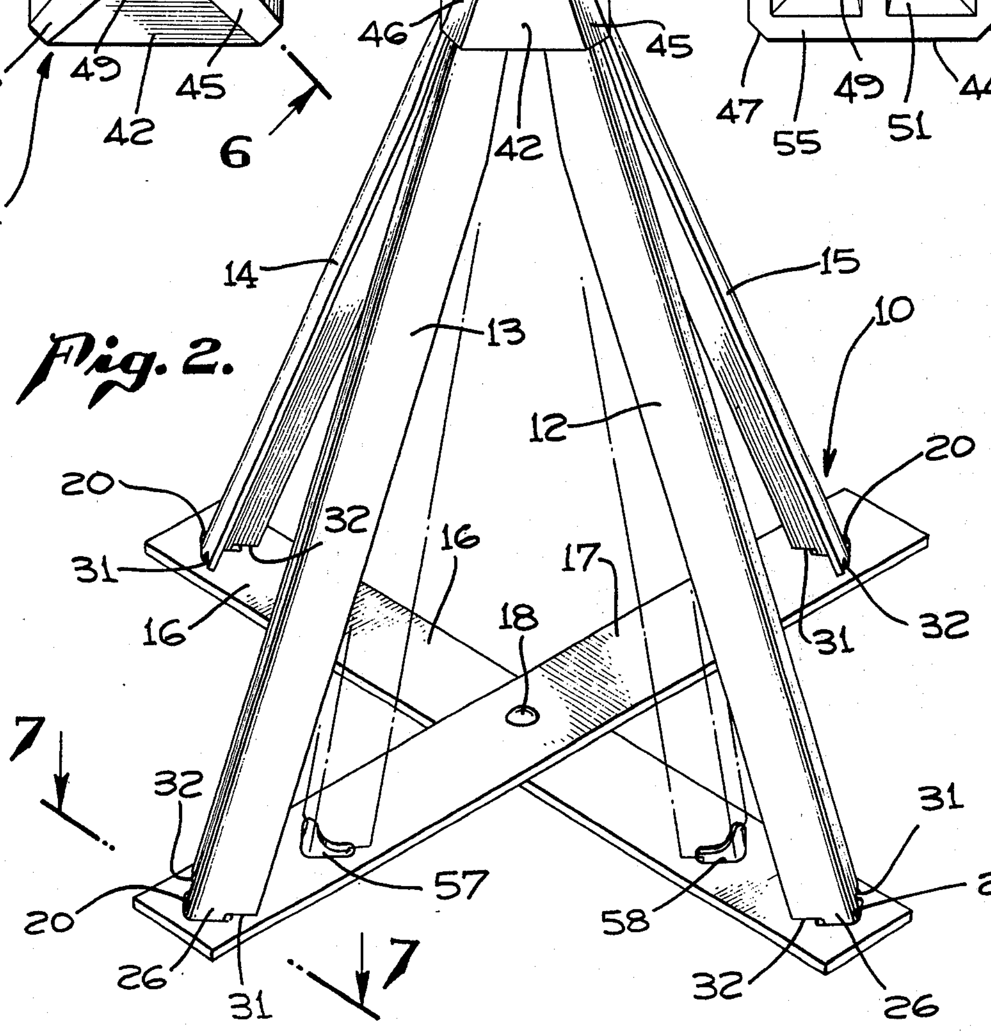
Fig. 2.

Fig. 6.
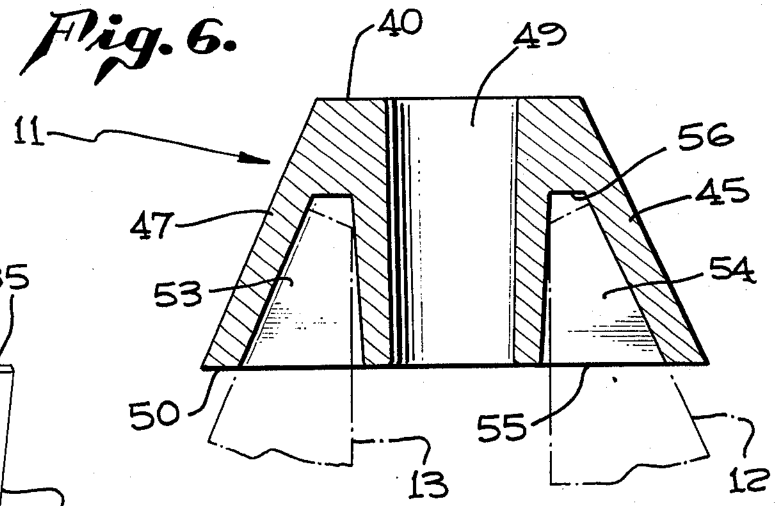
Fig. 5.
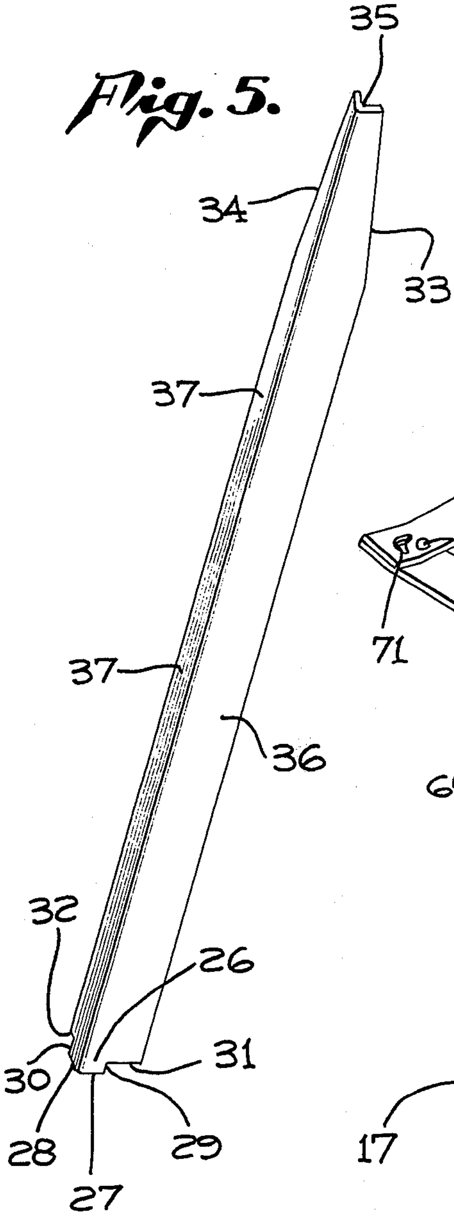
Fig. 8.
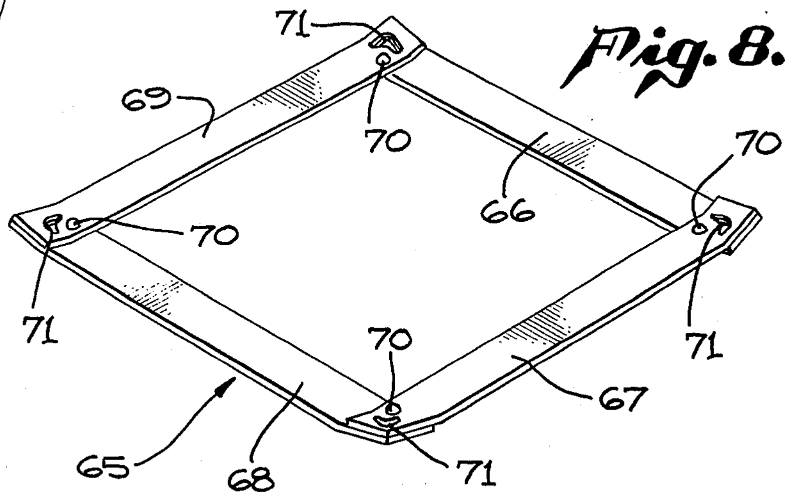
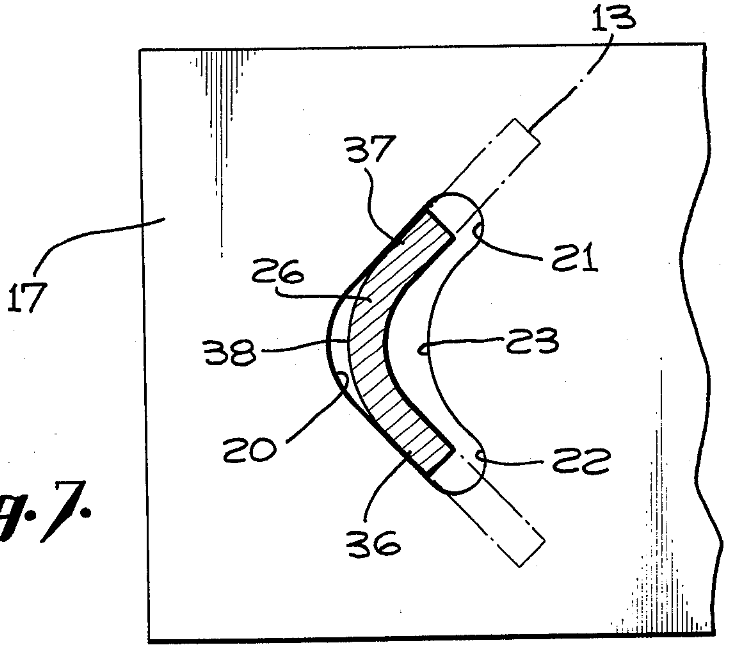
Fig. 7.

JACK STAND

This is a Continuation-In-Part of Ser. No. 477,697 filed June 10, 1974, now abandoned.

The invention concerns a stand of substantially fixed height of such character that it can be used to support house trailers when they are parked, the drawbar end of trailers in general or, in fact, any relatively stationary and appreciably heavy weight which needs a relatively stable support.

Although the height required for such a stand is reasonably well fixed at a set dimension, some slight variation is found advantageous as long as it does not impair the stability of the device.

What is also significant is that the stand be capable of being dismantled when not needed and stored in compact condition in a relatively small space. To have such a stand capable of being dismantled while, at the same time, being one which is rugged and stable when assembled requires some special construction meeting such demands while still making the stand one capable of being readily dismantled by hand.

Various stands have been available ranging from mere blocks of wood or concrete to somewhat complicated adjustable stands which can be elevated and lowered by employment of a crank with a rack and pinion. Blocks are not always acceptable because of their weight and bulk, especially when it might be advantageous to move them together with the vehicle. Adjustable-type stands often are not stable enough to be dependable and, when constructed in a stable fashion, are frequently unnecessarily expensive. They also have the disadvantage of not being readily stowed.

It is therefore among the objects of the invention to provide a new and improved jack stand for supporting stationary vehicles and other weights which is very rugged in its construction, simple in its assembly, and capable of being quickly and readily dismantled.

Another object of the invention is to provide a new and improved stand for supporting vehicles and comparable loads, parts of which are uniform and interchangeable, and, which though particularly rugged, has a structural arrangement permitting it to be relatively light in weight compared to the amount of load it is capable of carrying.

Still another object of the invention is to provide a new and improved stand for supporting stationary loads which besides being stable in a position for one selected height, can be shifted to accommodate a different selected height without sacrificing its rugged stability.

Still another object of the supporting is to provide a new and improved stand for supportidng stationary loads which is capable of being readily disassembled and subsequently assembled, which is relatively simple and inexpensive not only to manufacture but also to assemble and disassemble, and which in disassembled condition is such that it occupies a relatively compact space.

With these and other objects in view, the invention consists in the construction, arrangement, and combination of the various parts of the device, whereby the objects contemplated are attained, as hereinafter set forth, pointed out in the appended claims and illustrated in the accompanying drawings.

In the drawings:

FIG. 1 is a side elevational view of the stand in use in supporting a trailer.

FIG. 2 is a side elevational view of the stand in assembled condition.

FIG. 3 is a plan view of the cap.

FIG. 4 is a bottom view of the cap.

FIG. 5 is a side perspective view of one of the struts.

FIG. 6 is a longitudinal sectional view on the line 6—6 of FIG. 3.

FIG. 7 is a fragmentary sectional view on the line 7—7 of FIG. 2.

FIG. 8 is a side perspective view of a second form of base construction.

In an embodiment of the invention chosen for the purpose of illustration, there is shown a stationary jack stand device consisting of a base indicated generally by the reference character 10, a cap 11 and struts 12, 13, 14 and 15 extending from the base to the cap. The jack typified in use supporting a draw bar 8 of a trailer 9 is shown in FIG. 1.

In the embodiment of FIG. 2, the base consists of two straps 16 and 17 pivotally interconnected at their center points by means of a rivet 18. Connected as described, this has the advantage of permitting the base, when the device is disassembled, to be compacted one strap upon the other thereby to occupy a minimum amount of space when stowed.

At the outermost ends of each of the straps there is provided a hole 20, each of the holes being identical. For the form of invention of FIG. 2, the holes are somewhat angular in configuration but such that although opposite ends 21 and 22 of the hole are relatively narrow, there is a wide portion 23 at the angular junction almost twice as wide as the ends.

Each strut 12, 13, 14 and 15 is identical with respect to every other strut. The strut 12, for example, is substantially angular in cross section throughout its length, but the form of the strut varies as between opposite ends. In each instance the end of the strap which is adapted to be received in the respective hole 20 is provided with a projection 26 formed by tapering end edges 27 and 28 and longitudinal edges 29 and 30. Adjacent the longitudinal edge 29 is a shoulder 31 and adjacent the longitudinal edge 30 is another shoulder 32.

At the opposite end of each strap are long tapered edges 33 and 34 which terminate in a transverse edge 35.

It is further significant that although the strut in each instance has a generally angular shape, opposite sides 36 and 37 are bent with respect to each other on a very generous radius forming a curved mid-portion 38. This curved mid-portion is maintained throughout the length of the strut to facilitate a binding fit.

The cap 11 is provided with a flat top 40 and four oblique side walls 41, 42, 43, and 44. The side walls are joined by respective flat corner sections 45, 46, 47, and 48. At the center of the flat top is provided a cylindrical bore 49.

Extending upwardly from a bottom plane 50 are four pockets 51, 52, 53, and 54 to accommodate the respective four struts. Each pocket is identical with respect to every other pocket and tapers from a relatively large outside end 55 to a relatively small bottom end 56. Each pocket, in turn, is roughly angular in cross section corresponding substantially to the cross-sectional dimension of the upper end of the strut defined by the tapered edges 33 and 34. The pocket, however, is of such size that it slidably and relatively snuggly accommodates the respective end of the strut. With this relationship any movement of a load on the cap 11 tends to tighten and stabilize the attachment of the struts in the cap as the sloping sides are pushed more snuggly into place. A relatively loose relationship prevails with respect to the recesses which receive the projections at the lower ends of the strut.

When the device is to be assembled, the straps 16 and 17 are extended in the form of a cross as illustrated in FIG. 2, the projections of the respective struts are inserted in the holes 20 and the upper ends of the struts are then slid, one into each of the four pockets in the cap. The upper ends of the struts have a sufficiently snug fit within the pockets so that the transverse edge 35 remains spaced from the bottom wall 57 and the side edges can be wedged tightly into position.

If it be desired to have the elevation of the cap slightly higher than that shown in FIG. 2, holes 58 and 59 respectively in the straps 16 and 17 may be made use of for two of the struts, namely, the struts 12 and 13 in the embodiment shown. This has the effect of making a slightly narrower but higher form elevating the top of the cap a corresponding amount, without however narrowing the expanse of the base portion enough to impair the stability. When in erected position and under load, the shoulders 31 and 32 at the lower end of each of the struts provide an ample area of support on the top face of the respective strap, the holes 20 being sufficiently generous in their cross-section area to permit the strut to be tilted in the manner shown without binding on the edge of the hole.

When the jack is to be dismantled, it is necessary only to lift the cap from the upper ends of the struts whereafter each strut can be freely withdrawn from the respective hole 20, the straps 16 and 17 folded upon each other, the struts laid along the straps, thus making a compact bundle in which the cap 11 is readily incorporated.

In the form of invention of FIG. 8, a base 65 is constructed of four side straps 66, 67, 68, and 69 joined at their adjacent ends by a bolt and nut assembly 70 in the form of a square. Ends of the straps are bent upwardly slightly at the area of holes 71 to additionally brace the strut when it is inserted in the hole. The holes 71 are of the same size and cross-sectional configuration as the holes 20 described in connection with FIG. 1 so as to accommodate struts of precisely the same configuration.

In the form of invention of FIG. 8, the base 65 can be collapsed either by loosening the nuts and the straps folded together in the form of a collapsed parallelogram, or the nut assemblies can be removed and the straps stacked together for stowing. The struts and the cap are used with the base 65 in the same fashion as has been described in connection with the embodiment of FIG. 2.

Although in the embodiment of FIG. 2 a four-strut assembly has been selected, it will be appreciated that a three-strut assembly is possible especially making use of side straps with ends joined together in the manner described in connection with the form of FIG. 8. Under such circumstances, the cap would need be provided with no more than three pockets to accommodate a requisite number of three struts.

While the invention has herein been shown and described in what is conceived to be a practical and effective embodiment, it is recognized that departures may be made therefrom within the scope of the invention, which is not to be limited to the details disclosed herein but is to be accorded the full scope of the claims so as to embrace any and all equivalent devices.

Having described the invention, what is claimed as new in support of Letters Patent is:

1. A stationary jack stand comprising a base having a plurality of upwardly open recesses equally spaced from each other at the perimeter, a cap having an equivalent number of downwardly open pockets in a grouping closer together than said recesses in the base, each pocket having two adjoining walls in right angular relationship relative to each other forming an angular corner with said angular corner facing laterally outwardly, and fixed partitions integral with the cap separating each pocket from all of the other pockets, each pocket having a closed inner end and having a cross sectional shape diminishing progressively from an open outer end to said inner end, and a set of struts equal in number to the number of recesses in the base, the lower end of each strut having a projection adapted to fit slideably and releasably in the respective recess in the base and shoulder means adapted to overlie the base, the upper end of each strut having a cross sectional shape diminishing progressively toward the upper end, the uppermost end being larger than the innermost end of the respective pocket, the upper end of the strut being slideably and releasably receivable in the respective pocket of the cap.

2. A stationary jack stand as in claim 1 wherein the struts comprise legs equidistant from each other and angularly disposed relative to each other, said legs being angular in cross section throughout the length of the struts and the projections thereon, each pocket and each recess having a pair of angularly disposed sides complementary to the respective legs of the corresponding strut.

3. A stationary jack stand as in claim 2 wherein there are two optional recesses in the base for at least one of the struts whereby to vary the effective elevation of the cap when the device is assembled.

4. A stationary jack stand as in claim 1 wherein the base has four recesses and the cap has a corresponding number of pockets.

5. A stationary jack as in claim 2 wherein the legs join at a right angle along a common line forming a corner and the corner of each of the legs faces outwardly with respect to a vertical axis of the jack and being transversely arcuate.

6. A stationary jack as in claim 1 wherein the base comprises two straps pivotally attached to each other at their midportions and wherein said recesses are adjacent the outer ends of the respective straps, whereby to enable said base to be collapsed when the jack is disassembled.

* * * * *